(12) United States Patent
Gardner (10) Patent No.: US 8,353,484 B2
(45) Date of Patent: Jan. 15, 2013

(54) COCKPIT RUDDER CONTROL MECHANISM FOR AN AIRCRAFT

(75) Inventor: Kenneth D. Gardner, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 676 days.

(21) Appl. No.: 12/615,895

(22) Filed: Nov. 10, 2009

(65) Prior Publication Data

US 2011/0108674 A1  May 12, 2011

(51) Int. Cl.
B64C 19/02 (2006.01)
(52) U.S. Cl. .................................................. 244/235
(58) Field of Classification Search .................. 244/221, 244/229, 231, 232, 226, 235, 234; 74/469, 74/478; 715/865; 345/156, 184, 157, 161, 345/163–167; 472/130
See application file for complete search history.

(56) References Cited

U.S. PATENT DOCUMENTS

| | | | | | |
|---|---|---|---|---|---|
| 1,650,636 | A | * | 11/1927 | McCauley | 244/235 |
| 1,655,698 | A | * | 1/1928 | Hicks | 244/235 |
| 2,048,448 | A | * | 7/1936 | Hofer | 244/235 |
| 2,424,523 | A | * | 7/1947 | Watter | 244/235 |
| 2,478,546 | A | * | 8/1949 | Pickens et al. | 244/235 |
| 2,585,688 | A | * | 2/1952 | Saulnier | 244/235 |
| 2,610,006 | A | * | 9/1952 | Boyce | 244/235 |
| 2,697,566 | A | * | 12/1954 | Glass | 244/222 |
| 3,377,881 | A | * | 4/1968 | Lucas | 74/512 |
| 3,576,302 | A | * | 4/1971 | Palfreyman | 244/236 |
| 4,192,476 | A | * | 3/1980 | Byers | 244/235 |
| 4,470,570 | A | * | 9/1984 | Sakurai et al. | 244/235 |
| 4,484,722 | A |   | 11/1984 | Larson et al. | |
| 4,848,708 | A | * | 7/1989 | Farrell et al. | 244/235 |
| 5,056,742 | A | * | 10/1991 | Sakurai | 244/235 |
| 5,725,184 | A | * | 3/1998 | Kang et al. | 244/235 |
| 5,878,981 | A | * | 3/1999 | Dewey | 244/190 |
| 7,644,893 | B2 | * | 1/2010 | Boczar et al. | 244/235 |
| 7,690,604 | B2 | * | 4/2010 | Christensen et al. | 244/235 |
| 7,726,611 | B2 | * | 6/2010 | Christensen et al. | 244/235 |
| 7,806,372 | B2 | * | 10/2010 | Boczar et al. | 244/223 |
| 7,874,526 | B2 | * | 1/2011 | Boczar et al. | 244/235 |
| 2007/0205333 | A1 | * | 9/2007 | Boczar et al. | 244/235 |
| 2008/0023591 | A1 | * | 1/2008 | Christensen et al. | 244/235 |
| 2008/0105790 | A1 | * | 5/2008 | Christensen et al. | 244/235 |
| 2010/0072322 | A1 | * | 3/2010 | Boczar et al. | 244/228 |
| 2010/0078524 | A1 | * | 4/2010 | Boczar et al. | 244/235 |

* cited by examiner

Primary Examiner — Tien Dinh
Assistant Examiner — Michael A Fabula
(74) Attorney, Agent, or Firm — Lathrop & Gage LLP (57) ABSTRACT

A cockpit rudder control mechanism is described for accepting aircraft control input utilizing rudder pedals depending from a movable carriage to rotate a shaft. The mechanism may be removed from the aircraft for maintenance and the position of the mechanism within the aircraft may be adjusted for a particular user. Movement of the rudder pedals is conveyed by linkages to a collar which rotates a shaft. The rotation of the shaft is measured for control input to the aircraft or is transferred to the mechanical control systems for the aircraft.

28 Claims, 9 Drawing Sheets

COCKPIT RUDDER CONTROL MECHANISM FOR AN AIRCRAFT

BACKGROUND

1. Field of the Invention

The cockpit rudder control mechanism described herein relates to aircraft, specifically to aircraft control systems. More specifically it relates to systems for accepting control input from a pilot, co-pilot or other users of the cockpit rudder control mechanism. The cockpit rudder control mechanism also relates to adjustable and removable control system inputs.

2. Description of the Related Art

Because of the way they are integrated into the aircraft, typical cockpit rudder control mechanisms must be installed early in the manufacturing process. Later manufacturing steps must be performed around the mechanism, further impeding aircraft construction. Also, typical cockpit rudder control mechanisms are difficult to remove, repair or replace after initial installation.

Typical cockpit rudder control mechanisms also have a symmetric response to user input. More specifically, when one rudder pedal is pushed a certain distance in the forward direction the other pedal is moved the same distance to the aft in the aircraft. This symmetric motion is not optimal for a user.

SUMMARY OF THE INVENTION

The cockpit rudder control mechanism disclosed herein, in embodiments, is a system for accepting control input from a pilot, co-pilot or other operator of an aircraft. The mechanism incorporates two rudder pedals suspended from a carriage. The rudder pedals are pivotally attached to vertical members that depend from and are pivotally attached to the carriage. In embodiments, the carriage is movably attached to the frame of the aircraft, allowing the carriage and the attached rudder pedals to be moved on the frame of the aircraft in relation to the user of the system.

In embodiments, a shaft is rotatably attached to the frame of the aircraft for accepting control input and transferring it to the aircraft control surface. The shaft is splined or otherwise keyed to accept a rotational hub or collar. The shaft need not be splined if other means for securing the collar to the shaft are provided. The rotational collar may be rotated along the length of the shaft as needed to adjust the location of the rudder pedals. The rotational collar is connected to the vertical members by two spherical linkages.

As the rudder pedals are moved back and forth by the user of the mechanism, the vertical members pivot beneath the carriage. The movement of the vertical members displaces the linkages which in turn rotate the rotational collar and the shaft. In embodiments, the rotation of the shaft is measured by means of measuring angular displacement and used as a control input. In other embodiments, the rotation of the shaft is transferred to the aircraft control surface through a mechanical control system.

In embodiments, an optional lead screw, rotatably attached to the frame of the aircraft, may be provided as a means of translating the cockpit rudder control mechanism. The threads of the lead screw engage a threaded block attached to the carriage. As a user of the mechanism rotates the lead screw, the threaded block is carried along the length of the lead screw and causes the carriage to translate along the guide rails provided on the aircraft frame. Other methods of adjustment may also be provided, such as motors, pneumatic pistons, or pins located along the guide rails.

As the carriage is translated it moves the vertical members, linkages, rotational collar and rudder pedals simultaneously. This translation allows users of different heights to adjust the location of the rudder pedals to a position that is safe and comfortable. It also allows the carriage, vertical members, rudder pedals, linkages and rotational collar to be removed as a unit to provide for ease of installation and maintenance.

In embodiments, the operation of the cockpit rudder control mechanism also provides for an asymmetric response providing more comfort to the user thereof. When one rudder pedal is moved in the forward direction, the other pedal moves aft a distance that is shorter than the distance moved by the forward pedal.

DETAILED DESCRIPTION

Figure 1:
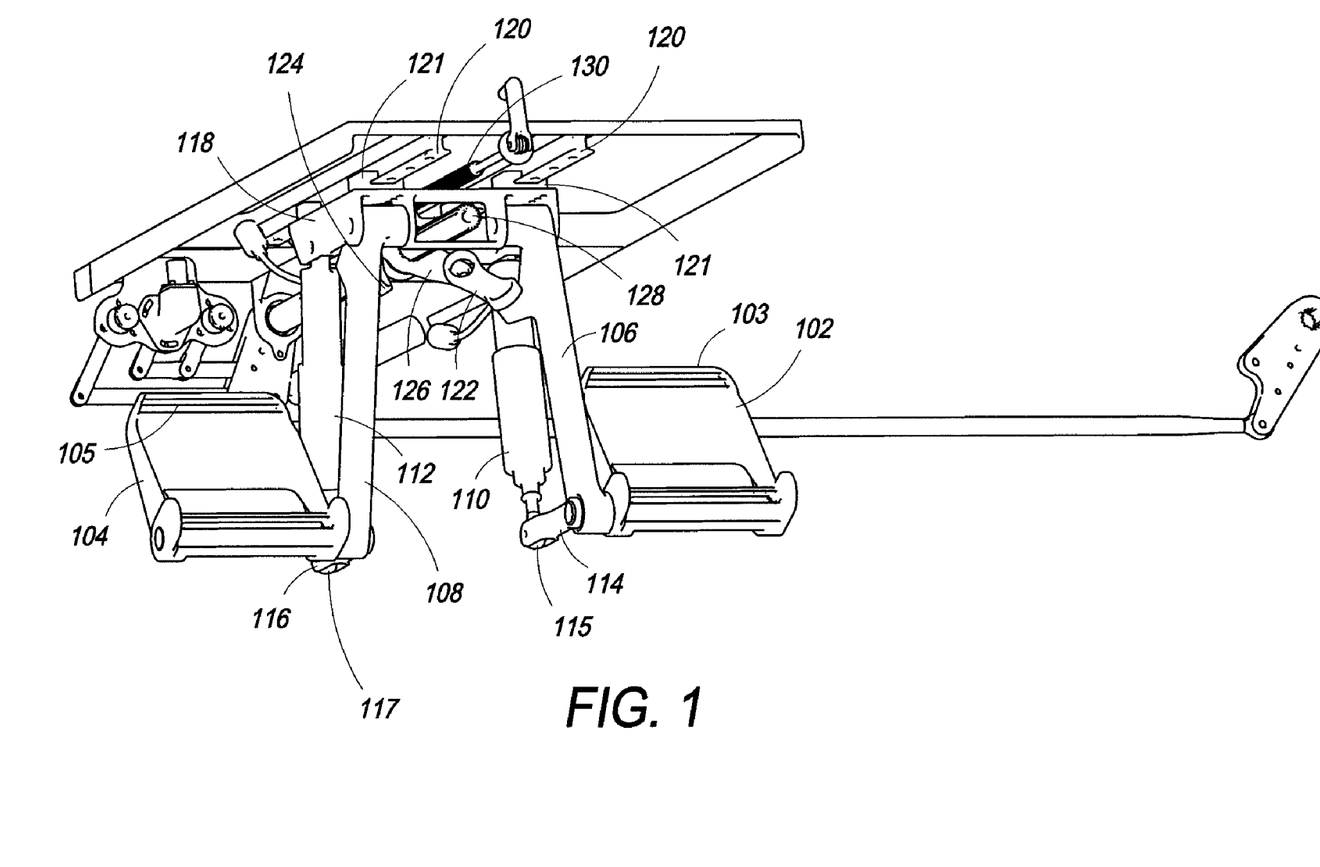
FIG. 1 is a perspective view of an embodiment of the cockpit rudder control mechanism.

Referring now to FIG. 1, a perspective view of the cockpit rudder control mechanism 100 is shown. Rudder pedals 102 and 104 are pedals for use in receiving control input from the pilot of an airplane, specifically for receiving control input for the yaw axis of flight control. Rudder pedals 102 and 104 are pivotally attached to one end of vertical members 106 and 108, respectively. Rudder pedals 102 and 104 are also pivotally attached to one end of vertical members 110 and 112 by arms 114 and 116, respectively. Arms 114 and 116 are fixedly attached to rudder pedals 102 and 104, thus maintaining the angle between the rudder pedal 102 and 104 and the arm 114 or 116 attached to the pedal.

Vertical members 106, 108, 110 and 112 depend from and are pivotally attached at one end to adjustable carriage 118, and may also be referred to as depending members. The pivotal attachments between vertical members 106, 108, 110 and 112 and carriage 118 and rudder pedal 102 and 104 allow the rudder pedals 102 and 104 to move along an arc in forward and backward (aft) directions, with respect to the aircraft, in response to pressure from the feet of a pilot utilizing the cockpit rudder control mechanism 100.

As rudder pedals 102 and 104 move along an arc forward and aft, the vertical members 106, 108, 110 and 112 maintain the angle between rudder pedals 102 and 104 and a reference plane at an approximately constant angle. The reference plane is substantially parallel to the plane of the carriage 118. This angle can be modified by rotational movement of the pedals by the user of the mechanism 100.

In some embodiments of the invention, vertical members 110 and 112 may be linear variable differential transformers (LVDT) which convert linear motion of the system to which they are attached into an electrical signal. LVDT devices commonly include multiple electrical windings, configured as a transformer, and a movable core. The overall length of the LVDT varies as the system to which it is connected translates in the direction parallel to the axis of the LVDT. In a common LVDT, the change in length causes the movement of the core within the LVDT which alters the electrical properties of the transformer in the LVDT. Such devices may include a feedback force, such as springs, to return the LVDT to its neutral position and length. Various other designs and devices for measuring translation may be utilized as members 110 and 112 and still be within the scope of this system.

When such devices for measuring translation are utilized as members 110 and 112 the rudder pedals 102 and 104 may be rotated by the user by pressing on the upper ends, 103 and 105 respectively, of the rudder pedals 102 and 104. When the user presses on the upper ends, 103 and 105, the rudder pedals 102 and 104 cause arms 114 and 116 to rotate around vertical members 106 and 108. The rotation of arms 114 and 116 cause the arcuate movement of the ends, 115 and 117 respectively, of arms 114 and 116 in an arc around the pivotal connection between rudder pedals 102 and 104 and vertical members 106 and 108.

The component of movement of arms 114 and 116 that is parallel to the axis of the vertical members 110 and 112 causes the LVDT members to lengthen. This change in length causes the LVDT to output a variable electrical signal for use by the aircraft brake control systems. When the user ceases applying force to the upper ends 103 and 105 of the rudder pedals 102 and 104, respectively, the feedback force of the LVDT will return the rudder pedals to their neutral position. The electrical signal produced by the LVDT is not necessary for the operation of the rudder control system, but may be used for brake control, or other similar uses.

Carriage 118 depends from at least one guide rail 120. Carriage 118 is slidably attached to rails 120 by guide blocks 121 or other means. Rails 120 are attached to the frame members of the aircraft in which the cockpit rudder control mechanisms 100 is installed.

Vertical members 106 and 108 are connected by spherical linkages, or links, 122 and 124 to a rotational member, shown in the depicted embodiment as splined collar 126. Splined collar 126 is mated to splined shaft 128 which is rotatably mounted to the frame of the aircraft. Rotating vertical members 106 and 108 in a forward or aft direction causes linkages 122 and 124 to move and to rotate collar 126 around its axis thus turning the shaft 128 on its axis, as will be described in more detail in relation to other figures. The linkages 122 and 124 with collar 126 also link the movement of vertical members 106 and 108 so that when vertical member 106 pivots forward vertical member 108 pivots aft and vice versa.

Figure 3:
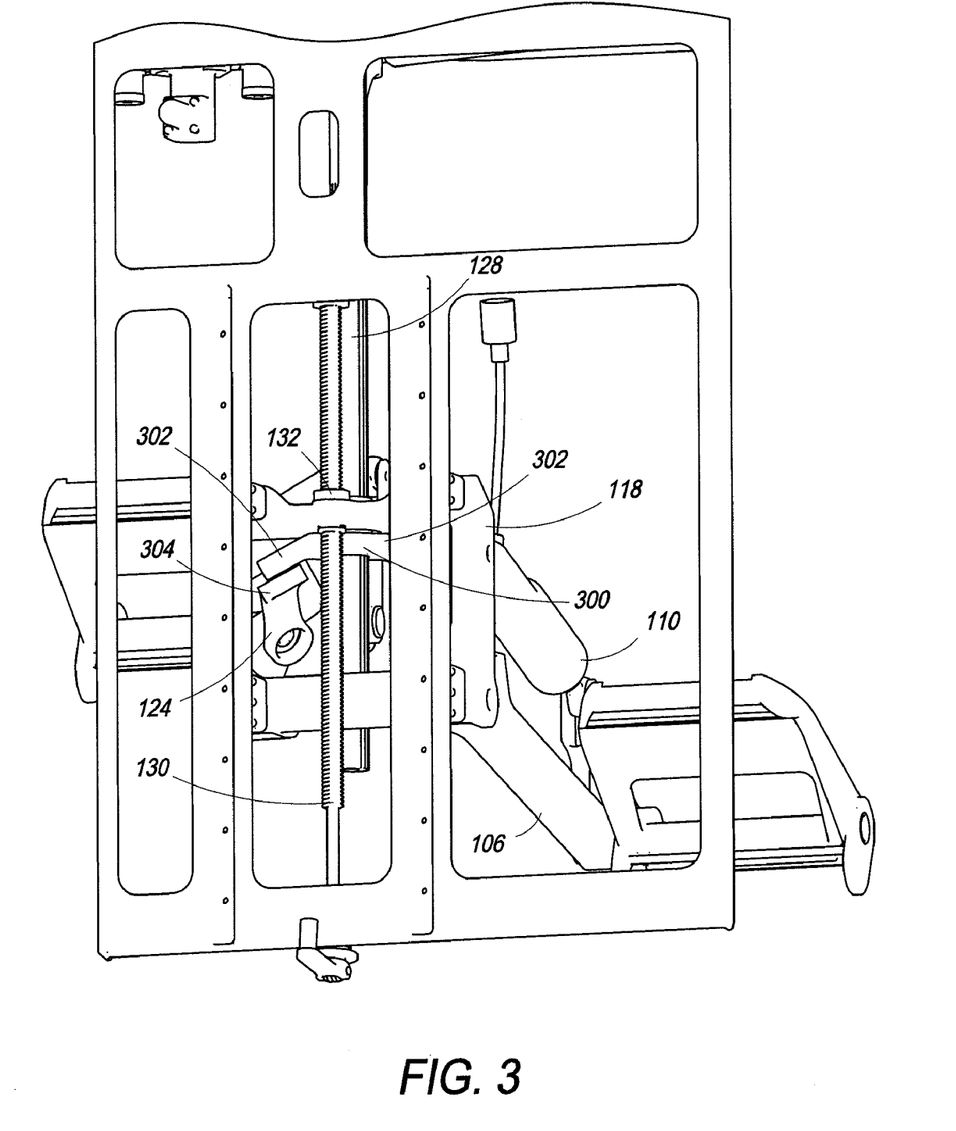
FIG. 3 is a top view of an embodiment of the cockpit rudder control mechanism.

Optional lead screw 130 is rotatably attached to a frame member of the aircraft in which the cockpit rudder control mechanism 100 is installed. Threaded block 132, shown in FIG. 3, is attached to carriage 118 and engages the threads on lead screw 130. As a pilot or other user of the cockpit rudder control mechanism 100 turns lead screw 130, the threads of the screw 130 advance threaded block 132 forward or backward thus translating carriage 118 and rudder pedals 102 and 104 forward and backward as necessary to adjust the pedals for comfortable and safe use by the pilot.

The lead screw 130 may be actuated manually by turning a knob or handle, or may be actuated by an electrical motor, pneumatic piston or other such means of rotating the lead screw. If no lead screw 130 is used in the cockpit rudder control mechanism 100, some other means for locking the carriage in place may be provided such as pins located along a track or the guide rails 120.

The rudder pedals 102 and 104, vertical members 106, 108, 110 and 112, arms 114 and 116, carriage 118, linkages 122 and 124, and splined collar 126 constitute the removable portion of the cockpit rudder control mechanism 100. The removable portion of the cockpit rudder control mechanism 100 can be installed and removed from the aircraft as a unit, and can be installed after the guide rails 120, splined shaft 128, lead screw 130 and other components of the cockpit rudder control mechanism 100 have been installed in the aircraft.

Figure 2:
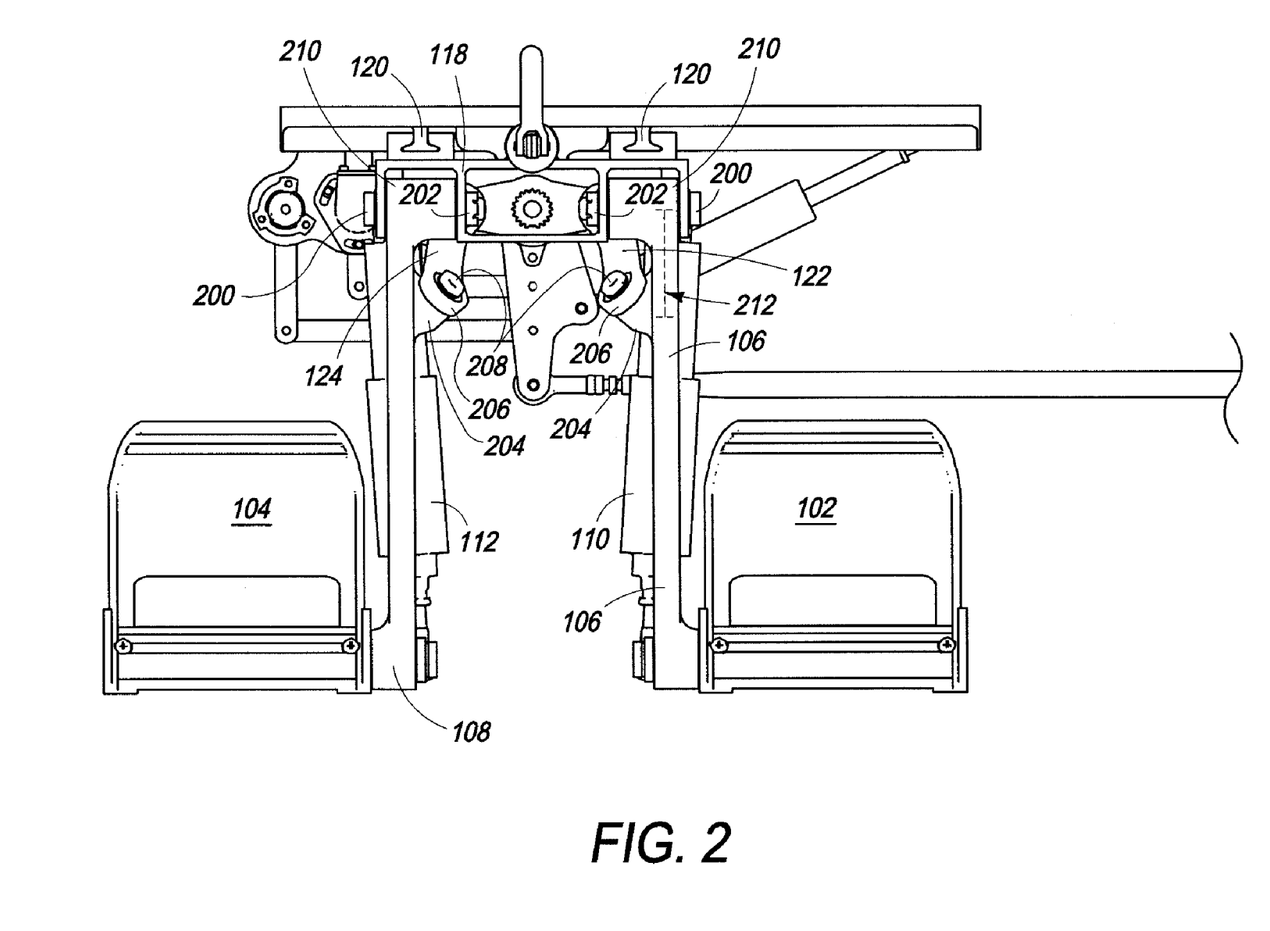
FIG. 2 is a front view of an embodiment of the cockpit rudder control mechanism.

Referring now to FIG. 2, a front view of a portion of an embodiment of the cockpit rudder control mechanism 100 is shown. The vertical members 106 and 108 depend from and are pivotally connected to carriage 118 by bolts 200 and nuts 202.

Vertical members 106 and 108 provide linkage mount points 204 for connecting linkages 122 and 124 at end 206 thereof to the vertical members 106 and 108. In the embodiment shown in the figures, the mount points 204 are integrally formed with vertical members 106 and 108, however in other embodiments of the cockpit rudder control mechanism 100, the mount points 204 may be attached to the vertical members 106 and 108 by welding, bolts, or other appropriate form of attachment.

Linkages 122 and 124 at an end 206 thereof are pivotally attached to mount points 204. In the embodiment shown in the figures, mount points 204 have threaded receptacles for bolts 208 which pivotally secure the end 206 of linkages 122 and 124 to vertical members 106 and 108. In a preferred embodiment of the mechanism 100, mount points 204 are oriented so that linkages 122 and 124 pivot around an axis that is at an angle to the longitudinal axis of vertical members 106 and 108. This allows each bearing to rotate in two dimensions instead of pivoting in three dimensions. In alternative embodiments of the mechanism 100, mount points 204 may be on the longitudinal axis of vertical members 106 and 108, and provided with bearings for pivoting in three dimensions.

The mount points 204 are located along the length of and slightly forward of the axis of vertical members 106 and 108. The mount points 204 are separated from the end 210 of vertical members 106 and 108 by a distance $D_1$ depicted for purposes of clarity as 212 on FIG. 2. Since mount points 204 are disposed slightly forward of the vertical members 106 and 108, distance $D_1$ is not measured along the aft face of the vertical members 106 and 108, but is measured directly between 210 and mount point 204 along a line at angle slightly forward of the axis of vertical members 106 and 108 and lying in the plane extending forward and aft of line 212. As vertical members 106 and 108 are pivoted forward and backward by a user of the cockpit rudder control mechanism 100, mount points 204 are moved along a circular arc with a length $L_1$ determined as follows:

$$L_1 = \frac{\theta \pi D_1}{180}$$

where θ is the angle in degrees through which vertical members 106 and 108 are pivoted by the user of the cockpit rudder control mechanism 100.

The distance $D_1$ may be altered in various embodiments of the cockpit rudder control mechanism 100 to optimize the amount of displacement of mount points 204 for a given input displacement of the rudder pedals 102 and 104. Where the length of vertical members 106 and 108 are given by $D_v$ and the arc length of the movement of rudder pedals 102 and 104 is given by $L_v$, the relationship between the distances is given by:

$$L_1 = L_V \frac{D_1}{D_V}$$

The movement of mount point 204 also moves the ends 206 of linkages 122 and 124 along the arc.

Referring now to FIG. 3, a top view of the cockpit rudder control mechanism 100 is shown. The splined collar 126 is seen through the opening in the top of carriage 118. Splined collar 126 comprises a hub 300 and two wings 302 extending outwardly from the hub 300. For purposes of description the splined collar 126 shall be described with reference to a longitudinal axis coincident with the longitudinal axis of splined shaft 128, and a transverse plane perpendicular to the longitudinal axis.

A back face of hub 300 is substantially circular and lies in the transverse plane. Hub 300 extends a distance along the longitudinal axis comprising the thickness of the hub 300. A splined hole for receiving splined shaft 128 is situated along the longitudinal axis of hub 300 and extends through the entire thickness of the hub 300.

In the embodiment of the cockpit rudder control mechanism 100 shown in the figures, wings 302 are attached to hub 300 substantially on the edges thereof at points located substantially 180 degrees from each other when measured around the longitudinal axis. Variations in the relative positions of the two wings 302 may be utilized to alter the characteristics of the cockpit rudder control mechanism 100. In the embodiment of the cockpit rudder control mechanism 100 shown in the figures, the wings 302 may be integrally formed with the hub 300, however in other embodiments of the cockpit rudder control mechanism 100 the wings may be welded, bolted or otherwise fastened to the hub 300.

The wings 302 extend from hub 300 at an angle with respect to the transverse plane. The wings 302 may be relatively flat, or may curve along their length as they extend from hub 300. At the end of wing 302 a hole, or other means of attachment, is provided for attaching the wing 302 to linkages 122 and 124. In the embodiment of the cockpit rudder control mechanism 100 shown in the figures, wings 302 are attached to linkages 122 and 124 at an end 304 thereof by a bolt 306 extending through holes provided through the wing 302 and the end 304 of linkages 122 and 124.

Bolt 306 is secured by castellated nut 308 and washer 310, which elements are not shown in FIG. 3 for purposes of clarity. In other embodiments of the cockpit rudder control mechanism 100 the wings 302 may be attached to linkages 122 and 124 by other methods known for pivotally attaching two members. As can be seen with reference to FIGS. 2 and 3, linkages 122 and 124 are curved or bent such that the pivot axis of the end 206 of the linkages 122 and 124 is not parallel to the pivot axis of the end 304 of the linkage 122 and 124. This curvature allows the pivotal connections to rotate only in two dimensions during operation of the mechanism 100. In other embodiments of the mechanism 100, linkages 122 and 124 may be substantially flat or only slightly curved and provided with bearings that pivot in three dimensions.

As described in relation to FIG. 2, ends 206 of linkages 122 and 124 are moved substantially along an arc by actuation of rudder pedals 102 and 104. For purposes of description, when rudder pedals 102 and 104 are moved away from the user of the cockpit rudder control mechanism 100 they shall be described as moving forward, and similarly when they move toward the user they shall be described as moving backward or aft.

The cockpit rudder control mechanism 100 converts the forward and backward movement of the rudder pedals 102 and 104 into rotational motion. The conversion of the direction and type of movement is effected by the various angles of mounting and shape of the components of the cockpit rudder control mechanism 100. Mount point 204 secures linkages 122 and 124 at an angle to the vertical members 106 and 108.

Spherical linkages 122 and 124 are shaped with an angle between the pivot axis of the two ends thereof, and wings 302 are curved towards the pivot point with the linkages 122 and 124. These mounting angles and curved shapes convert the substantially horizontal arcuate movement of rudder pedals 102 and 104 into substantially vertical arcuate movement of wings 302. The movement of wings 302 causes the rotation of hub 300 around the axis of splined shaft 128 which provides input to the control mechanisms of the aircraft.

Figure 4:
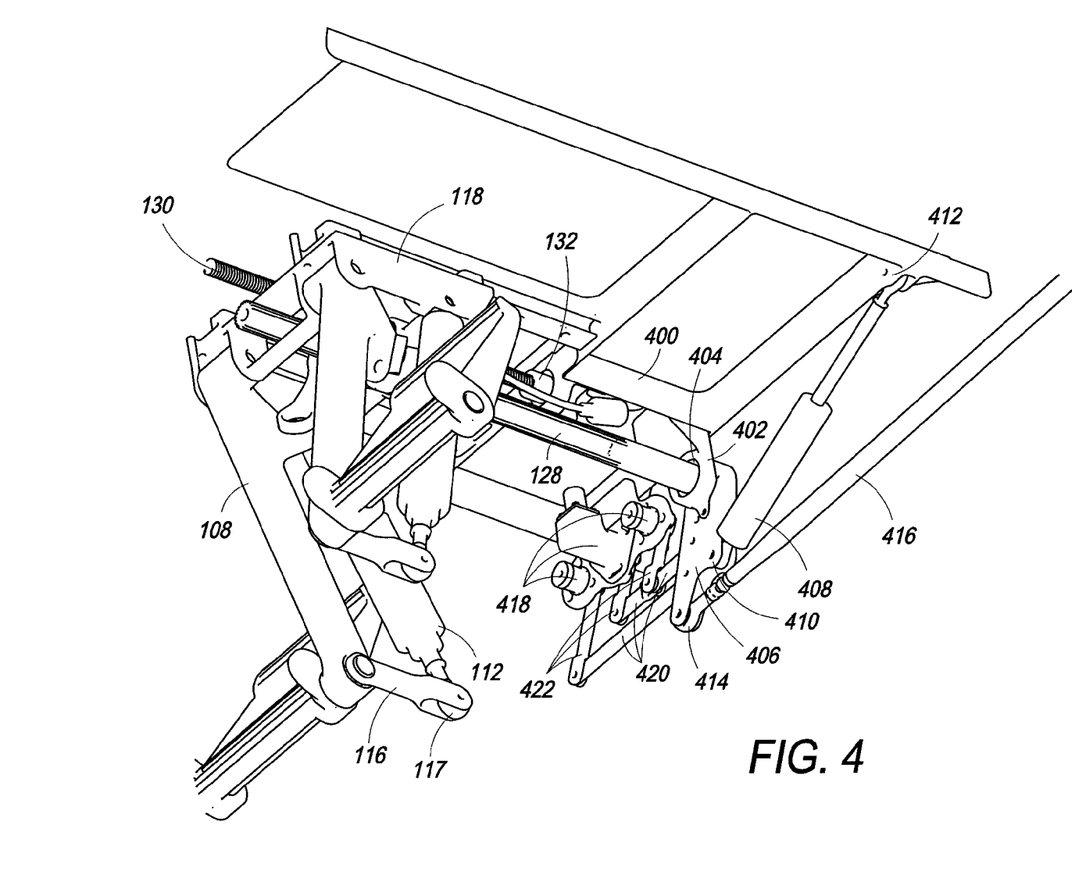
FIG. 4 is a perspective view of a portion of an embodiment of the cockpit rudder control mechanism.

Referring now to FIG. 4, a perspective view of a portion of an embodiment of the cockpit rudder control mechanism is shown, specifically the mounting for splined shaft 128 and the interface between splined shaft 128 and the control systems for the aircraft in which the cockpit rudder control mechanism 100 is installed. Splined shaft 128 is rotatably mounted on a frame member 400 of the aircraft.

Frame member 400 may be horizontal as shown in this embodiment, or vertical, such as a bulkhead. In the embodiment shown in FIG. 4, splined shaft 128 is supported by mounting bracket 402 and bearing 404 and by splined collar 126.

Bell crank 406 is also fixedly attached to splined shaft 128 at a convenient point along its length. Bell crank 406 is maintained at a certain rotational position by appropriate means such as the two springs or bungee 408 in the embodiment shown in FIG. 4. Bungee 408 is attached on one end to a mount 410 of bell crank 406 and on the other end to mounting point 412 on the aircraft frame. Bungee 408 provides resistance to the rotation of splined shaft 128 and also to the movement of rudder pedals 102 and 104, thus providing a feedback force to the user of the system 100. It also returns the rudder pedals 102 and 104 and splined shaft 128 to the neutral position when no force is exerted on the pedals 102 and 104.

In some embodiments of the cockpit rudder control mechanism 100, a second mount point 414 of bell crank 406 is interconnected with another cockpit rudder control mechanism in the pilot or co-pilot position in the aircraft by connecting rod 416. The interconnection causes the second bell crank 406 in the second cockpit rudder control mechanism to rotate the shaft in that system by action of the various members and linkages to move the rudder pedals in the other system. Thus when a pilot or co-pilot actuates the rudder pedals 102 and 104 the rudder pedals in the adjacent mechanism move simultaneously. In some embodiments of the cockpit rudder control mechanism, the interconnection of the bell cranks 406 at ends 414 may be provided by a shaft 416 pivotally attached at each end to the ends 414 of the two bell cranks 406.

In a preferred embodiment, the rotation of splined shaft 128 is interfaced to the aircraft control system through a device that measures the angular displacement of the splined shaft. Such devices include rotary variable differential transformers (RVDTs). The angular displacement, as measured, is then used as an input into the aircraft control system that controls the deflection of the rudder of the aircraft or other yaw control device. In the embodiment of the cockpit rudder control mechanism shown in the figures, three RVDTs 418 are provided to measure the rotation of splined shaft 128. The bell crank 406 is connected to the RVDTs 418 by arms 420 which rotate arms 422 that extend from RVDTs 418. The RVDTs 418 are electrically connected to the aircraft control system.

In other embodiments of the cockpit rudder control mechanism, other means of interfacing the mechanism to may be utilized. For example, bell crank 406 may be directly connected to control surfaces through connecting linkages and the mechanical control systems of the aircraft, or other electrical or other transducers may be used to identify the position of the bell crank and provide that information to the aircraft control system.

In the typical operation of an aircraft with a vertical rudder, a forward displacement of the right rudder pedal will effect a deflection of the rudder to the right of the vertical stabilizer of the aircraft. Similarly, a forward displacement of the left rudder pedal will effect a deflection of the rudder to the left of the vertical stablizer. This operation will vary for aircraft with other types or configurations of control surfaces such as spoilerons or split ailerons, and in some configurations the rudder input may be used as part of a general flight control system. The exact means of effecting the deflection of the rudder or other control surface do not constitute any part of this invention, and may be performed in a variety of processes.

Figure 5A:
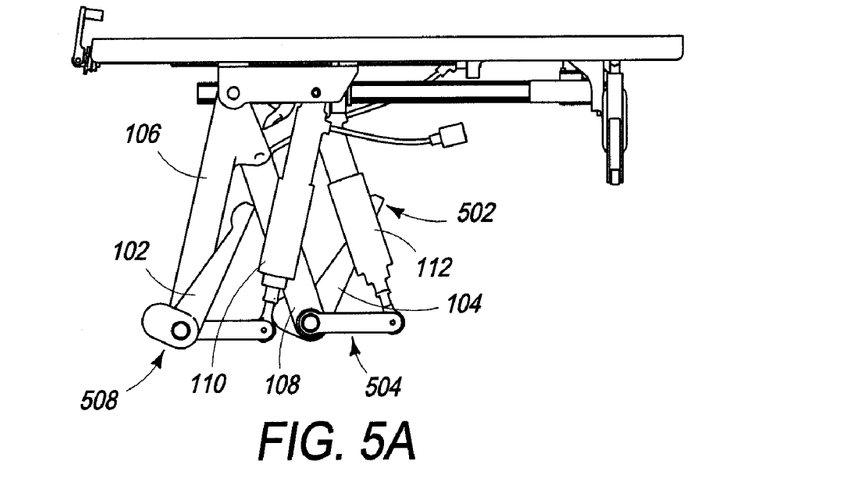
FIG. 5A is a side view of an embodiment of the cockpit rudder control mechanism in an extended position.
Figure 5B:
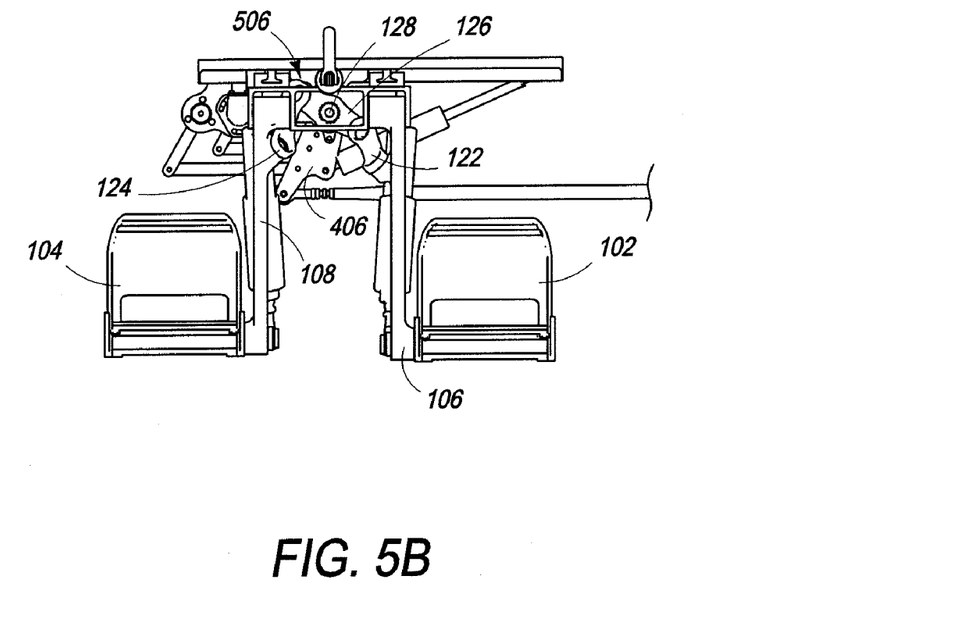
FIG. 5B is a front view of an embodiment of the cockpit rudder control mechanism in an extended position.
Figure 5C:
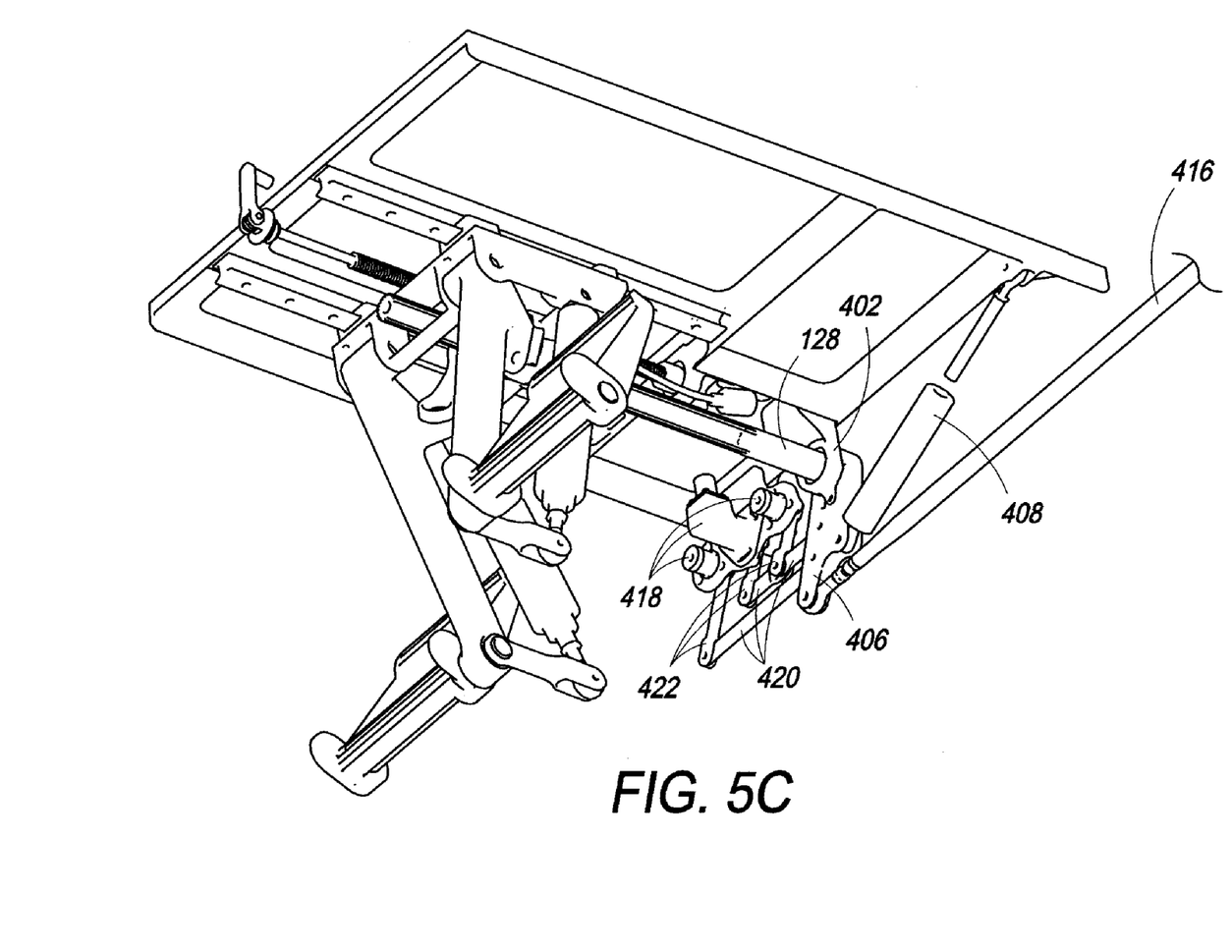
FIG. 5C is a perspective view of an embodiment of the cockpit rudder control mechanism in an extended position.
Figure 6A:
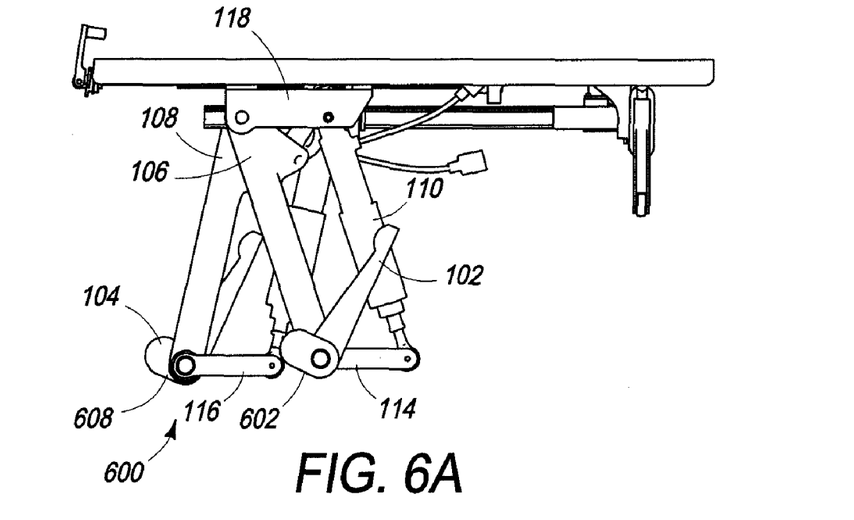
FIG. 6A is a side view of an embodiment of the cockpit rudder control mechanism in an extended position.
Figure 6B:
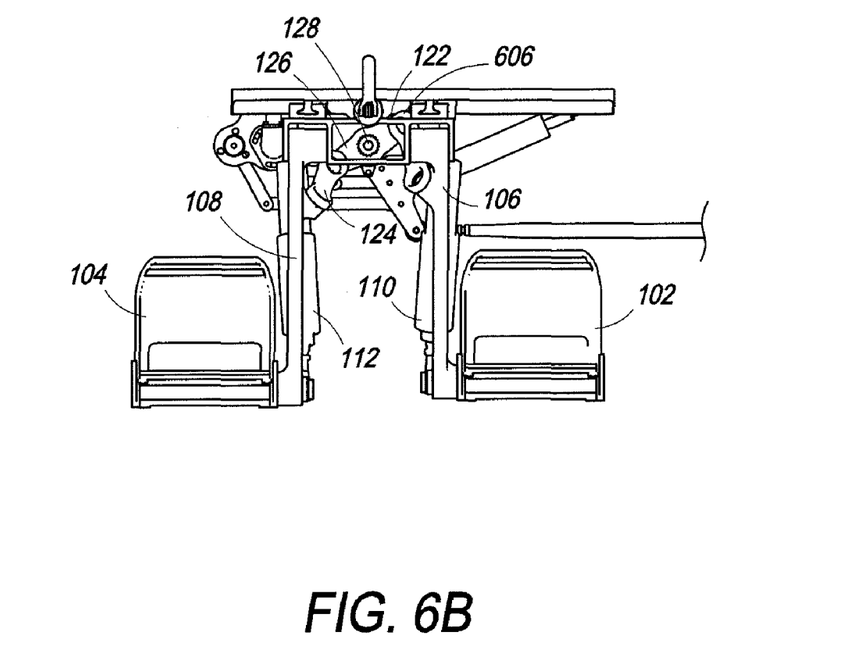
FIG. 6B is a front view of an embodiment of the cockpit rudder control mechanism in an extended position.
Figure 6C:
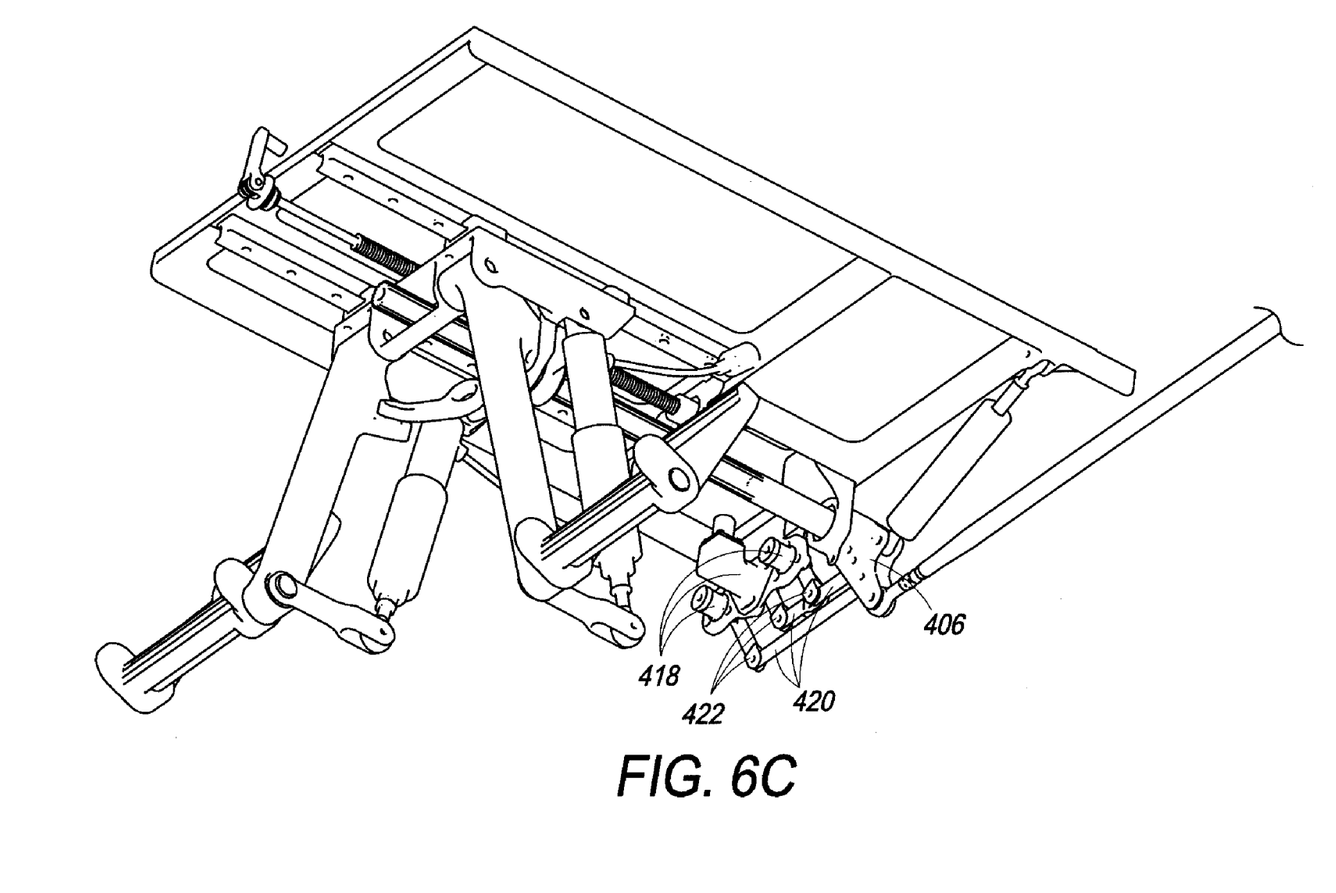
FIG. 6C is a perspective view of an embodiment of the cockpit rudder control mechanism in an extended position.

Referring now to FIGS. 5A, 5B, 5C, 6A, 6B and 6C, the cockpit rudder control mechanism is shown in two extended positions. In FIGS. 5A, 5B and 5C the left rudder pedal 104 has been pushed forward by the user of the system. In FIGS. 6A, 6B and 6C the right rudder pedal 102 has been pushed forward by the user of the system.

Referring to FIGS. 5A, 5B and 5C, the system is shown in position 500 with left rudder input given by a user of the cockpit rudder control mechanism 100. Rudder pedal 104 has moved to position 502. The movement of rudder pedal 104 pivots member 108 and through the pivotal interconnections of the elements, the quadrilateral bounded by members 108 and 112, arm 116 and a portion of carriage 118 varies as shown to position 504.

As can be seen in FIG. 5B, the movement of member 108 pushes linkage 124 and causes splined collar 126 to rotate to position 506, simultaneously rotating splined shaft 128 and bellcrank 406 in a clockwise direction when viewed from the position of a user of the mechanism 100, and thus providing control input to the other control systems of the aircraft through the RVDTs 418 or other control system interface. The rotation of splined collar 126 also moves linkage 122 thus moving vertical member 106, member 110, arm 114 and rudder pedal 102 to position 508.

Referring now to FIG. 5C, the rotation of bell crank 406 is depicted when left rudder pedal 104 has been pushed forward by the user of the mechanism. The rotation of splined shaft 128 described above causes bell crank 406 to be rotated in a clockwise manner. The rotation of bell crank 406 moves arms 420 to the left, which in turn causes the rotation of arms 422 which extend from and are pivotally mounted on RVDTs 418. As described above, in other embodiments of the mechanism other means of coupling the rotation of the splined shaft 128 to the aircraft control system may be utilized within the scope of the invention.

Referring to FIGS. 6A, 6B and 6C, the mechanism is shown in position 600 with right rudder input given by a user of the cockpit rudder control mechanism 100. Rudder pedal 102 has moved to position 602. The movement of rudder pedal 102 pivots member 106 and through the pivotal interconnections of the elements, the quadrilateral bounded by members 106 and 110, arm 114 and a portion of carriage 118 varies as shown.

As can be seen in FIG. 6B, the movement of member 106 pushes linkage 122 and causes splined collar 126 to rotate to position 606, simultaneously rotating splined shaft 128 and providing control input to the control systems of the aircraft. The rotation of splined collar 126 also moves linkage 124 thus moving vertical member 108, member 112, arm 116 and rudder pedal 104 to position 608.

Referring now to FIG. 6C, the rotation of bell crank 406 is depicted when right rudder pedal 102 has been pushed forward by the user of the mechanism. The rotation of splined shaft 128 described above causes bell crank 406 to be rotated in a counter-clockwise manner. The rotation of bell crank 406 moves arms 420 to the right, which in turn causes the rotation of arms 422 which extend from and are pivotally mounted on RVDTs 418. As described above, in other embodiments of the mechanism other means of coupling the rotation of the splined shaft 128 to the aircraft control system may be utilized within the scope of the invention.

The movement of rudder pedals 102 and 104 forward and aft is not symmetric with respect to the distance traveled by each pedal. For small deflections, the rudder pedal moving forward does move approximately the same distance as the pedal moving to the aft. For example, when one pedal is moved forward by 5 degrees forward around the pivot point of the respective vertical member, the other pedal moves aft only 4.5 degrees around the pivot point of the vertical member to which it is attached.

For larger deflections, the asymmetry is larger. When one pedal is pivoted forward by 18 degrees, the other pedal is pivoted aft by only 12 degrees. This asymmetry is produced by the circular path of the linkages around the collar 126, described in more detail below.

Figure 7:
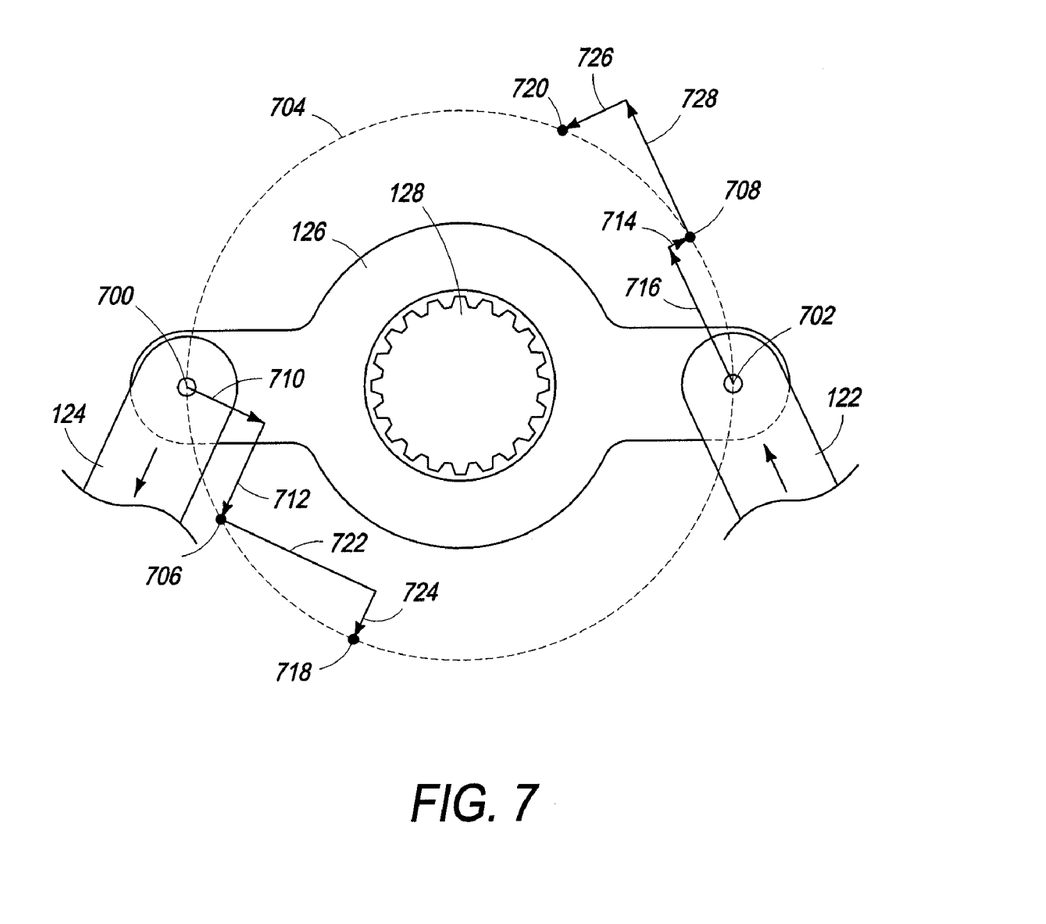
FIG. 7 is a detail view of an embodiment of the spherical linkages and the splined collar.

Referring now to FIG. 7, a detailed view of splined shaft 128, splined collar 126 and a portion of spherical linkages 122 and 124 is shown. The collar 126 and spherical linkages 122 and 124 are shown in the neutral position which corresponds to rudder pedals 102 and 104 in a position equidistant from the user of the system 100.

Spherical linkages 122 and 124 are pivotally attached to the collar 126 as described above. At the neutral position, linkage 124 pivots at point 700 and linkage 122 pivots at point 702. As collar 126 rotates around shaft 128, the points 700 and 702 are constrained by collar 126 to move along circle 704. Circle 704 does not correspond to a physical element but only a virtual path followed by the described points. As described above, the movement of the rudder pedals 102 and 104 cause the movement of the spherical linkages 122 and 124, and the rotation of collar 126 and thus shaft 128.

As the spherical linkages 122 and 124 are displaced, the movement can be considered to contain two components, one parallel to the longitudinal axis of the respective linkage and the other perpendicular to the longitudinal axis of the respective linkage. For example, when rudder pedal 102 is pivoted forward, spherical linkage 122 moves point 702 to point 708 rotating collar 126. The rotation of collar 126 moves point 700 to point 706.

The movement of point 700 to 706 can be divided into a component perpendicular to the longitudinal axis of linkage 124, shown on FIG. 7 as distance 710, and a component parallel to the longitudinal axis of linkage 124, shown on FIG. 7 as distance 712. Similarly, the movement of point 702 to point 708 can be divided into two components, a perpendicular component of distance 714 and a parallel component 716.

In the relatively small deflection of collar 126 to points 706 and 708, the distance 712 is less than distance 716, thus pedal 104 is moved aft a shorter distance than pedal 102 was moved forward by the user. In the example where the pedal 102 is pivoted by 5 degrees around the pivot point of vertical member 106 from carriage 118, pedal 104 is pivoted only 4.5 degrees around the pivot point of vertical member 108 from carriage 118.

As pedal 102 is pivoted farther forward by the user of the system 100, the difference in movement is more pronounced. As can be seen in FIG. 7, further movement of pedal 102 forward causes the movement of point 702 to point 720, and the movement of point 700 to point 718. The movement of pivot point 700 can be divided into perpendicular component 722 and parallel component 724.

The movement of pivot point 702 can be divided into perpendicular component 726 and parallel component 728. The parallel distance 728 for linkage 122 is substantially longer than the parallel distance 724 for linkage 124, thus the distance forward moved by pedal 102 is much greater than the distance aft moved by pedal 104. For example, when pedal 102 is pivoted by 18 degrees forward by the user, pedal 104 is pivoted only 12 degrees aft.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

What is claimed is:

1. A cockpit rudder control mechanism for an aircraft comprising:
   a carriage releasably attached to the aircraft;
   a first depending member extending downwardly from and pivotally attached to the carriage at a first end of said first depending member;
   a second depending member extending downwardly from and pivotally attached to the carriage at a first end of said second depending member;
   a first rudder pedal and a second rudder pedal, each attached to a second end of the first and second depending members, respectively;
   a shaft rotatably attached to the aircraft wherein the shaft extends between the first and second depending members;
   a collar slidably mounted on the shaft with respect to the longitudinal axis thereof;
   a first link pivotally connected between a first mount point on the first depending member and a first pivotal mount on the collar;
   a second link pivotally connected between a second mount point on the second depending member and the collar;
   wherein the collar is fixed to the shaft with respect to rotation thereof;
   wherein translation of the first and second rudder pedals translates the first and second link and rotates the collar and the shaft around its longitudinal axis; and
   wherein the longitudinal axis of the shaft is substantially parallel to the direction of translation of the first and second rudder pedals; and
   wherein the rudder of the aircraft is translated based upon the rotation of the shaft.

2. The cockpit rudder control mechanism of claim 1 wherein the carriage may be translated forward or aft in the aircraft.

3. The cockpit rudder control mechanism of claim 2 wherein the carriage depends from rails attached to the aircraft, and the carriage may be translated forward and backward on the rails.

4. The cockpit rudder control mechanism of claim 1 wherein the shaft is a splined or keyed shaft and the collar is splined or keyed.

5. The cockpit rudder control mechanism of claim 4 further comprising:
   a third and fourth depending member wherein the third depending member extends down from and is pivotally attached to the carriage at a first end of said third depending member and to the first rudder pedal at a second end of said third depending member;
   and wherein the fourth depending member is pivotally attached to the carriage at a first end of said fourth depending member and to the second rudder pedal at a second end of said fourth depending member.

6. The cockpit rudder control mechanism of claim 5 further comprising an actuator for translating the carriage on the rails.

7. The cockpit rudder control mechanism of claim 6 wherein the actuator for translating the carriage on the rails comprises a lead screw rotatably attached to the aircraft, and a threaded block mounted on the carriage, wherein the threads of the lead screw are engaged with the threaded block so that rotation of the lead screw translates the carriage forward and backward in relation to the aircraft.

8. The cockpit rudder control mechanism of claim 6 wherein the actuator for translating the carriage on the rails comprises an actuator selected from the group consisting of pneumatic pistons, electric motors, or hydraulic cylinders.

9. The cockpit rudder control mechanism of claim 1 wherein the first mount point and second mount point are separated by a fixed distance from the first ends of the first depending member and the second depending member respectively along the lengths thereof.

10. The cockpit rudder control mechanism of claim 1 wherein displacement of the first rudder pedal rotates the first depending member pivotally around its first end.

11. The cockpit rudder control mechanism of claim 10 wherein rotation of the first depending member moves the first mount point along an arc.

12. The cockpit rudder control mechanism of claim 11 wherein the displacement of the first mount point along an arc displaces the first link causing the rotation of the collar.

13. The cockpit rudder control mechanism of claim 12 wherein the collar rotates the shaft.

14. The cockpit rudder control mechanism of claim 13 wherein the angular displacement of the shaft is measured for input into an aircraft control system.

15. The cockpit rudder control mechanism of claim 14 wherein the collar displaces the second link, rotates the second depending member and displaces the second rudder pedal along an arc.

16. The cockpit rudder control mechanism of claim 15 wherein pushing the first rudder pedal forward moves the second rudder pedal aft and pushing the second rudder pedal forward moves the first rudder pedal aft.

17. The cockpit rudder control mechanism of claim 16 wherein the rudder pedals are displaced asymmetrically.

18. A cockpit rudder control mechanism for an aircraft comprising:
    a shaft used to activate a control mechanism;
    a rotational member on said shaft, wherein said rotational member is slidably mounted on said shaft;
    a pair of linkage members attached to said rotational member about said shaft;
    each of said linkage members being mechanically connected to one of a pair of pedal members, said pedal members when activated cause said linkage members to rotate said rotational member around the longitudinal axis of the shaft causing said shaft to rotate;
    wherein said shaft extends between said pedal members and has its longitudinal axis substantially parallel to the direction of translation of said pedal members; and
    wherein the rotation of the shaft activates said control mechanism to control the rudder of the aircraft.

19. The cockpit rudder control mechanism of claim 18 wherein forward or backward movement of the pedal members translates the linkage members which rotate the rotational member.

20. The cockpit rudder control mechanism of claim 19 wherein the rotational member rotates in a plane that is substantially perpendicular to the direction of movement of the pedal members.

21. The cockpit rudder control mechanism of claim 20 wherein the movement of the pedal members forward and aft is asymmetric.

22. The cockpit rudder control mechanism of claim 21 wherein the pedal members can be translated forward and aft within the aircraft to adjust to a user of the system.

23. The cockpit rudder control mechanism of claim 22 wherein the angular displacement of the rotational member is measured for controlling an aircraft.

24. The cockpit rudder control mechanism of claim 22 wherein the angular displacement of the rotational member is transferred to a mechanical control system for an aircraft.

25. A method for controlling an aircraft comprising the steps of:
    providing a first and second rudder pedal assembly;
    providing a shaft extending between the first and second rudder pedal assembly and with a longitudinal axis of the shaft disposed substantially parallel to the direction of translation of the first and second rudder pedal assembly;
    providing a first and second linkage pivotally attached to the first and second rudder pedal assemblies respectively;
    providing a rotational member slidably mounted on the shaft wherein the first and second linkage are pivotally attached to the rotational member;
    displacing one of the first and second rudder pedal assemblies in a forward direction thereby translating the first and second linkages and rotating the rotational member and the shaft;
    wherein a control surface of the aircraft is translated in response to the rotation of the shaft.

26. The method of claim 25 wherein the step of pushing one of the first and second rudder pedals further comprises displacing the first or second linkage attached to the rudder pedal assembly and rotating the rotational member.

27. The method of claim 26 further comprising the step of measuring the angular displacement of the rotational member.

28. The method of claim 26 further comprising the step of transferring the angular displacement of the rotational member to a mechanical control system for an aircraft.

* * * * *